US010740616B2

(12) United States Patent
Pira

(10) Patent No.: US 10,740,616 B2
(45) Date of Patent: Aug. 11, 2020

(54) METHOD FOR IDENTIFYING A SHOW IN A VIDEO FILMED BY A CAMERA OF A SPECTATOR

(71) Applicant: VIACCESS, Paris la Défense (FR)

(72) Inventor: Emmanuel Pira, Melesse (FR)

(73) Assignee: VIACCESS, Paris la Défense (FR)

( * ) Notice: Subject to any disclaimer, the term of this patent is extended or adjusted under 35 U.S.C. 154(b) by 98 days.

(21) Appl. No.: 16/074,627

(22) PCT Filed: Jan. 3, 2017

(86) PCT No.: PCT/FR2017/050004
§ 371 (c)(1),
(2) Date: Aug. 1, 2018

(87) PCT Pub. No.: WO2017/137672
PCT Pub. Date: Aug. 17, 2017

(65) Prior Publication Data
US 2019/0042848 A1 Feb. 7, 2019

(30) Foreign Application Priority Data
Feb. 12, 2016 (FR) ...................................... 16 51137

(51) Int. Cl.
*G06K 9/00* (2006.01)
*G06K 7/14* (2006.01)
(Continued)

(52) U.S. Cl.
CPC ....... *G06K 9/00684* (2013.01); *G06K 7/1413* (2013.01); *G06K 7/1417* (2013.01);
(Continued)

(58) Field of Classification Search
CPC ............. G06K 9/00684; G06K 7/1413; G06K 7/1417; G06K 9/00718; G06K 9/00744;
(Continued)

(56) References Cited

U.S. PATENT DOCUMENTS

| 7,782,339 B1* | 8/2010 | Hobbs | .................... H04N 19/12 345/555 |
| 2002/0027612 A1* | 3/2002 | Brill | ...................... G06T 1/0071 348/473 |

(Continued)

FOREIGN PATENT DOCUMENTS

| WO | WO 2006/060550 | 6/2006 |
| WO | WO 2016/026944 | 2/2016 |

OTHER PUBLICATIONS

Anonymous: "YouTube—Wikipedia, the free encyclopedia" Feb. 6, 2016 [website: https://en.wikpedia.org/w/index.php?title=YouTube &oldid-703571413] retrieved Dec. 9, 2016.

(Continued)

*Primary Examiner* — George Eng
*Assistant Examiner* — Umair Ahsan
(74) *Attorney, Agent, or Firm* — Occhiuti & Rohlicek LLP

(57) ABSTRACT

A method of identifying a show in a video that has been filmed by a spectator's camera includes selecting a color set to identify the show, recording, in a database, a show identifier associated with a code for the color set, before the show is filmed, inserting, within a scene in which the show is performed, a display-panel set, causing the display-panel set to display the color set without considering scene lighting, thereby raising a likelihood that the camera will capture the displayed color set, once the camera has begun filming a video of the scene, causing a tracer to download an image of the video, to search within the image for the color set associated by the database with the show identifier, and to respond to finding the color set by identifying the filmed show with the aid of the show identifier.

16 Claims, 1 Drawing Sheet

(51) Int. Cl.
    *G06K 9/46* (2006.01)
    *H04N 21/2187* (2011.01)
(52) U.S. Cl.
    CPC ..... *G06K 9/00718* (2013.01); *G06K 9/00744* (2013.01); *G06K 9/00979* (2013.01); *G06K 9/4652* (2013.01); *H04N 21/2187* (2013.01)
(58) Field of Classification Search
    CPC ............ G06K 9/00979; G06K 9/4652; H04N 21/2187; H04N 2005/91392; G06T 1/005; G06T 1/0085; G06F 21/16; G06F 2221/0737
    See application file for complete search history.

(56) References Cited

U.S. PATENT DOCUMENTS

| | | | |
|---|---|---|---|
| 2002/0191810 A1* | 12/2002 | Fudge | G06T 1/005 382/100 |
| 2003/0053003 A1 | 3/2003 | Nishi et al. | |
| 2006/0159302 A1* | 7/2006 | Goldberg | G06T 1/0028 382/100 |
| 2008/0080009 A1* | 4/2008 | Masui | G06T 1/0028 358/3.28 |
| 2008/0159586 A1* | 7/2008 | Van Leest | G06T 1/0085 382/100 |
| 2009/0123022 A1* | 5/2009 | Derrenberger | G06T 1/0085 382/100 |
| 2009/0326690 A1 | 12/2009 | Turchetta et al. | |
| 2012/0218471 A1* | 8/2012 | Gratton | H04N 21/2541 348/564 |
| 2012/0314085 A1* | 12/2012 | Gohshi | H04N 5/913 348/164 |
| 2017/0270630 A1* | 9/2017 | Creusen | G06T 1/005 |

OTHER PUBLICATIONS

Ishikawa et al. "Practical Evaluation of Illumination Watermarking Technique Using Orthogonal Transforms" Journal of Display Technology, IEEE Service Center, vol. 6, No. 9, Sep. 1, 2010 (8 pages).

* cited by examiner

METHOD FOR IDENTIFYING A SHOW IN A VIDEO FILMED BY A CAMERA OF A SPECTATOR

RELATED APPLICATIONS

This application is the national stage of international application PCT/FR2017/050004, filed on Jan. 3, 2017, which claims the benefit of the Feb. 12, 2016 priority date of French Application 1651137.

FIELD OF INVENTION

The invention relates to content distribution and in particular, to protection of rights in content.

BACKGROUND

A show is an event that runs in one or more scenes and that is performed before spectators. In some cases, a show requires performance artists or athletes. Examples of such shows are athletic events, concerts, and theater. However, other types of shows do not require actual participants. Examples include sound and light shows.

A scene is where a show takes place and where a spectator is likely to have an opportunity to film it with a camera. Examples of a scene include an athletic field or an auditorium. Other examples include the area from which fireworks can be seen, such as the area from which fireworks are set off. In either case, there will be a feature that can be used to support a display panel. An example of such a feature is a boulder, a tree, a post, a fence, a wall, or a vehicle.

Using a smartphone, a spectator can easily film a show and transmit the resulting film almost in real time to a great many third parties. For example, the film can be transmitted to a video-sharing platform that allows third parties to download the film and see that images it contains. As used herein, downloading refers both receiving a complete file containing the video and recording it in non-volatile memory for later playback and to streaming.

The term film of course does not literally mean a piece of celluloid as it once did. The term film and its cognates is used to indicate the functional equivalent of film.

In many cases, distribution of recorded content is illegal because it infringes copyright. To deter such illegal distribution, it is useful to provide a way to identify a show that has been filmed on video.

SUMMARY

Therefore an object of the invention is to propose a method for identifying a show in a video filmed by a spectator in which a mark identifying this show is inserted in the video without needing the cooperation of the spectator and while using a method to insert and detect the mark that is simple to implement. In particular, the method described and claimed herein is a non-abstract method that avoids the need to use a control camera to constantly adjust the readability of the mark and that promotes a rapid reduction in the readability of the mark in the filmed video as soon as the image capture point becomes more distant from the point from where the mark is projected.

Since the display panel is located within the scene where the show to be identified is performed, any video of the show filmed from a camera has a high chance of including the displayed specific color or colors regardless of the camera used. Thus, unless filming stops, the inlaying of the specific color or colors in the video filmed by the spectator cannot be easily avoided.

The use of a display panel located within the filmed scene means that the characteristics of each color displayed in the scene can be precisely controlled. In contrast to projecting just a mark, the use of a display panel makes the characteristics of the specific color or colors, such as those displayed, independent of the reflectivity or color of the elements of the scene. It is therefore no longer necessary to provide a sensor to control the readability of the mark present in the scene. This therefore greatly simplifies the implementation of the method for identifying the show in the video.

Furthermore, the characteristics of a color displayed by a display panel and as filmed by a camera are independent of the position of this camera relative to the display panel. Therefore, when the mark is being searched for in the images, it is not necessary to take into account a possible geometric deformation of the mark caused by the point of view. This also greatly simplifies the implementation of the identification method.

The identification method can include one or more of the characteristics of the dependent claims.

These embodiments of the identification method also exhibit the following advantages:

One advantage is that counting the number of pixels for which the color matches the specific color is a simple and effective method to reliably indicate whether the specific color is present in an image. Hence, a show can be identified in a video very quickly and almost in real time.

Another advantage is that providing tolerance limits when establishing a match between the color of a pixel and the specific color makes the identification method more robust against the sensitivity level of photodetectors of cameras used by the spectators. Cameras can be equipped with photodetectors that are more or less sensitive and more or less precise. These differences in precision and sensitivity result in the fact that the values that code the specific color in an image filmed by a camera may not exactly match the values that code this same specific color in the database.

Another advantage is that using specific colors to form a barcode provides for triggering the reading of this barcode only if, beforehand, those specific colors have been found in the downloaded image. Thus, the same specific colors fulfill both a marker function to identify the show and a coding function for additional information in the image.

Yet another advantage is that displaying the specific color or colors only during very short active periods provides for making the implementation of the method furtive and therefore not perceptible to the naked eye of a human being.

Yet another advantage arises from the use of the display panel to display other information during inactive periods provides for fulfilling two different functions using the same display panel, i.e. the identification of a scene and the displaying of additional information for the spectators.

In another aspect, the invention features an automatic and non-abstract method for interrupting the distribution of a video that can be downloaded from a video-sharing platform. This method includes identifying a predetermined show in the video that can be downloaded from the video sharing platform by implementing the non-abstract method described herein.

In another aspect, the invention features an electronic device for tracing a show in a video filmed by a camera of a spectator for the implementation of the non-abstract method described herein.

Lastly, another subject of the invention is a tangible and non-transitory information-recording medium containing instructions for the implementation of any one of the methods described herein when those instructions are executed by a microprocessor.

In general, methods and systems of all kinds can be implemented in abstract or non-abstract form. The non-abstract form exists in the real world in tangible form and achieves real world results. The abstract form only exists in the unreal world and only achieves unreal world results.

The methods and systems described herein are all implemented in non-abstract form. To the extent the claims are construed to cover both abstract and non-abstract implementations, the abstract implementations are hereby disclaimed.

BRIEF DESCRIPTION OF THE DRAWINGS

The invention will be better understood upon reading the following description given purely by way of non-limiting example and with reference to the drawings in which.

In these figures, the same reference numbers are used to denote the same features. Hereafter in this description, features and functions that are well known to a person skilled in the art are not described in detail.

DETAILED DESCRIPTION

Figure 1:
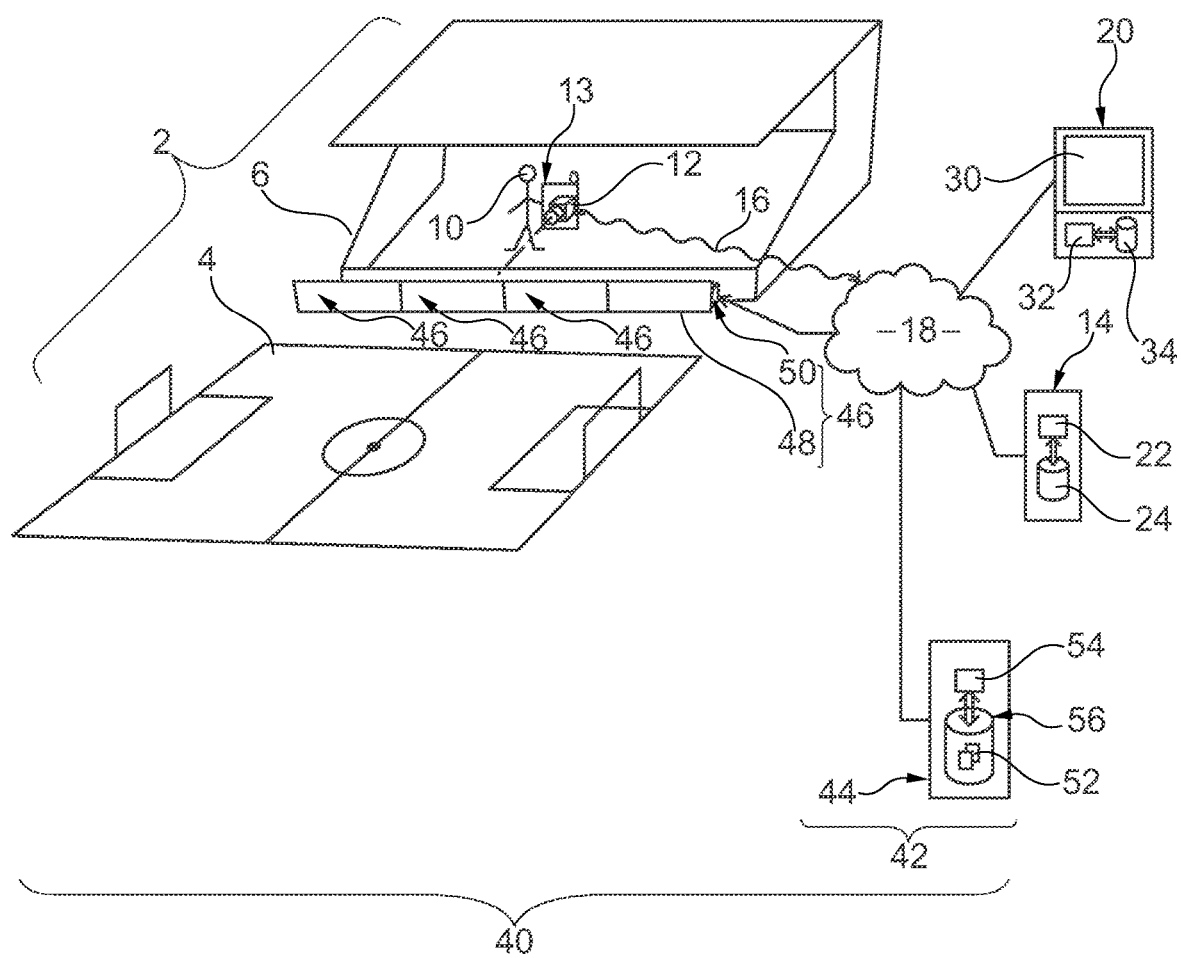
FIG. 1 is a schematic illustration, partly in perspective, of a system for the automatic interruption of the distribution of a video that can be downloaded from a video sharing platform.

FIG. 1 represents a scene 2 in which a show is being performed for which it is desired to control the distribution in video form. In this particular example, the scene 2 includes a soccer field 4, and stands 6 surrounding the field 4. To simplify FIG. 1, only one section of the stands 6 has been represented. However, the scene 2 includes, opposite the stands represented, other stands that are not represented. To simplify the drawing, the players on the field 4 have also not been represented.

In this example, the show is a soccer match played only on the field 4. Thus, in this embodiment, when the show is identified, the scene 2 is also identified and vice versa. The identifier of the show and the identifier of the scene 2 are in this case linked to one another by a bijective function. The terms identifier of the scene and identifier of the show are therefore equivalent. Therefore, in the description of this particular embodiment, they are used interchangeably.

During a soccer match, the stands 6 include a spectator 10 equipped with a camera 12. The spectator 10 uses this camera 12 to film the match as it takes place on the field 4.

The camera 12 is connected to a video-sharing platform 14 via a link 16 and a wide-area network 18. The camera 12 is integrated with or connected to a portable device 13 that a human being can readily transport by hand. In some embodiments, the portable device 13 is a smartphone and the camera 12 is a camera integrated into this smartphone and the link 16 is a wireless data-transmission link. In some embodiments, the link 16 complies with the UMTS (Universal Mobile Telecommunications System) or CDMA 2000 standard for 3G phones, or with the LTE (Long-Term Evolution) and WiMax standards for 4G phones.

The wide-area network 18 is typically a packet-switching network. In many cases, the is the World Wide Web or the Internet.

The video-sharing platform 14 is one that can stream the video being filmed by the camera 12 practically in real time to a large number of third-party terminals. The third-party terminals are terminals that are separate from the portable device 13 and generally located several kilometers from the spectator's camera 12. These third-party terminals are connected to the video-sharing platform 14 via a wide-area network such as the wide-area network 18.

Such video-sharing platforms are well known. For example, here, the video-sharing platform 14 is the platform presently used under the commercial name MEERKAT® or PERISCOPE®.

The video-sharing platform 14 includes one or more servers. For simplicity, FIG. 1 shows only one server. The server includes a programmable microprocessor 22 associated with a memory or with a group of memories 24. The memory 24 includes instructions required to implement the method of FIG. 3. The memory 24 can also store video filmed by the camera 12.

To simplify FIG. 1, only one third-party terminal 20 has been represented. The other third-party terminals are identical or similar to the illustrated terminal 20.

Figure 3:
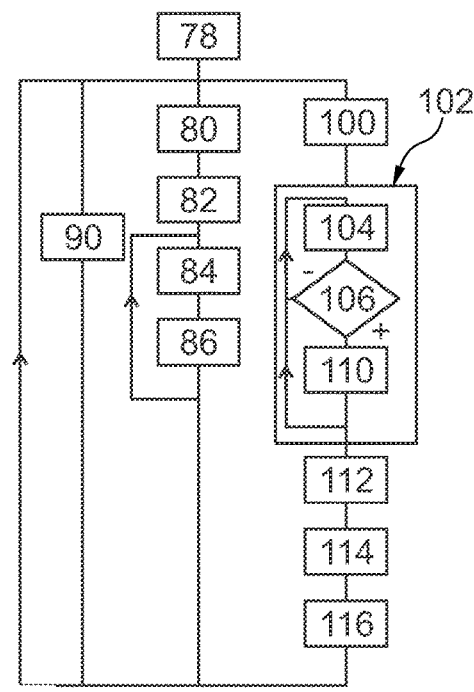
FIG. 3 is a flow chart of an automatic method for interrupting the distribution of a video that can be downloaded from a video sharing platform.

The terminal 20 typically includes a screen 30 for displaying the video distributed by the video-sharing platform 14 through the a wide-area network 18, a programmable microprocessor 32, and a memory 34 containing the instructions required to execute the method of FIG. 3 when they are executed by the microprocessor 32.

The broadcast of a match played on the field 2 can be subject to payment-based broadcasting rights. The spectator 10 who is filming this match and broadcasting it to the terminal 20 using the video-sharing platform 14 illegally circumvents these payment-based rights.

In the case of shows such as sports events, it is therefore important to put an end to the illegal distribution of the video filmed by the camera 12 and to do so in real time, while the event is still taking place. As used herein, real time denotes the fact that the illegal distribution of this video must be brought to an end as quickly as possible and, in particular, at least before the end of the show. This is because, at least in the case of athletic events, the illegal distribution after the end of the event attracts less interest from the users of the third-party terminals 20, primarily because one already knows who won the event. Conversely, if the video filmed by the camera 12 is distributed in real time by the video-sharing platform 14, the illegal offering seriously competes with the legal offering.

An automatic interrupter 40 for interrupting the distribution of a video filmed by a spectator is described herein in the context of a soccer match played on the field 4. However, the teaching given in this particular case can easily be replicated to prevent the distribution of other shows, for example those performed simultaneously, in other scenes.

The interrupter 40 includes a show identifier 42 for identifying a show in a video distributed by the video-sharing platform 14. The show identifier 42 includes a tracer 44 for tracing videos filmed by spectators and a display-panel set that comprises one or more display panels 46. These display panels 46 are controllable.

Each display panel 46 includes a screen 48 divided into a multitude of pixels. Typically, the screen 48 has more than 100 pixels, more than 1000 pixels, or more than 10,000 pixels. Each pixel displays one color at a time chosen from among a large number of possible visible colors. The number of possible colors is typically greater than 100, 1,000, or 10,000. Each possible color is coded by a set of values. A useful encoding system for encoding color is the RGB (Red Green Blue) coding system in which a triplet of values, RGB, defines each color.

Each display panel 46 also includes an electronic control unit 50 capable of receiving a color mark to display, and, in response, of commanding the pixels of the screen 48 to display the received mark. In the illustrated embodiment, the control unit 50 connects to the tracer 44 via the a wide-area network 18 to receive the mark to be displayed.

Preferably, the screen 48 exhibits a wide horizontal opening angle. This opening has a horizontal opening angle that defines an angle between the screen's central axis and that ray that is most inclined relative to the screen's central axis. The central axis is that axis that is perpendicular to the screen 48 and that passes through the screen's geometric center. The ray is emitted by a pixel of the screen 48 and contained in a horizontal plane containing the central axis. In a typical case, the horizontal opening angle is greater than 30° and preferably greater than 45° or 60°.

The screen 48 also has a wide vertical opening angle. The vertical opening angle is an angle between the screen's central axis and the ray that is the most inclined relative to this central axis, that is emitted by a pixel of the screen 48, and that is contained in a vertical plane containing the central axis. Typically, the vertical opening angle is greater than or equal to 25°, or 45°, or 60°.

The display surface area of the screen 48 is large. In some embodiments, it is larger than half a square-meter. In others, it is larger than a square meter, two square-meters, or three square-meters.

The display panels 46 are arranged within the scene 2 such that, regardless of the position of the spectator 10 inside the stands 6, in more than 10% or 25% or 50% of the images filmed using the camera 12, the combination of the surface areas of the screens 48 in these filmed images represents more than 0.5% and, preferably, more than 1% or 5% of the surface area of this image. In some embodiments, the display panels 46 are arranged all around the field 4 and are adjoining, one with the other.

In the illustrated embodiment, the display panels 46 are chosen from among the display panels already existing in the scene 2. For example, the display panels 46 are the conventional advertising display panels 46 located on the periphery of the field 4.

The tracer 44 controls the display panels 46 in order to display a color mark for identifying, simply and rapidly, the scene 2 in the videos filmed by the spectators.

To achieve this, the tracer 44 includes a database 52 containing for each different show to be identified, an identifier, coding values, and tolerance limits.

The identifier identifies the show and thus provides a way to unambiguously distinguishing one show from other shows performed simultaneously in other scenes in which other display panels 46 are also installed.

The coding values code each specific color associated with the identified show. There may be more than one such specific color. The set of one or more specific colors is referred to as a "color set."

The tolerance limits include upper or lower tolerance limits for each of the values coding each specific color.

In the embodiment described herein, since the colors are coded with RGB coding, color coordinates $R_i$, $G_i$, $B_i$ code the specific color $CS_i$, where the index $i$ is the identifier of the specific color. For these three color coordinates $R_i$, $G_i$, $B_i$, the expressions $MhR_i$, $MbR_i$, $MhG_i$, $MbG_i$, $MhB_i$, and $MbB_i$ denote the upper and lower limits, respectively, for each of these values.

The tracer 44 is also capable of downloading images of videos distributed by the video-sharing platform 14 as well as commanding, in response, the video-sharing platform 14. To do so, the tracer 44 connects to the video-sharing platform 14 via, for example, the wide-area network 18.

Typically, the tracer 44 is a server that includes a programmable microprocessor 54 and a memory 56. The memory 56 contains the instructions required to execute the method of FIG. 3. In the illustrated embodiment, the memory 56 also contains the database 52.

Figure 2:
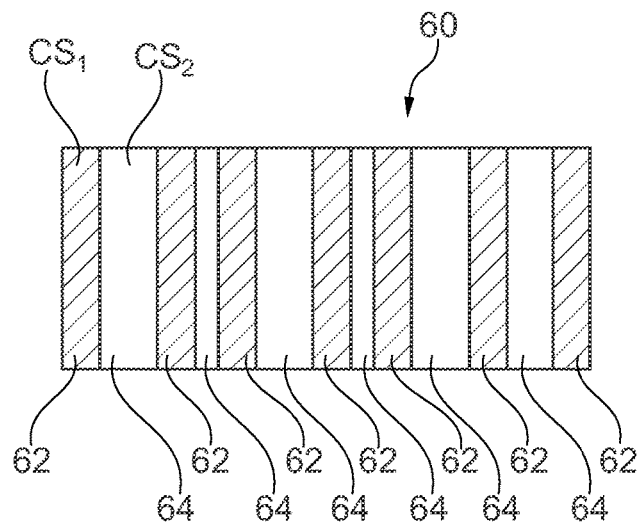
FIG. 2 is a schematic illustration of a mark used in the system of FIG. 1.

FIG. 2 represents an example of a color mark 60 capable of being displayed by a screen 48 to identify the scene 2. In this embodiment, only first and second specific colors, CS1, CS2 form the color mark 60. Furthermore, in this particular example, the first and second colors CS1, CS2 are juxtaposed, in an alternating manner, in any direction X, for example horizontal. In the particular embodiment shown the color mark 60 includes first bars 62 of a first uniform color CS1 and second bars 64 of a second uniform color CS2. The first bars 62 and second bars 64 are vertical bars.

The first and second bars 62 and 64 are arranged one immediately beside the other in any direction X by alternating one first bar 62 with one second bar 64 to form a one-dimensional barcode. The width and position of each of the first bars 62 and the second bars 64 are chosen so as to code additional information. The additional information can be any information, preferably other than the identifier of the show or of the scene 2. Examples of additional information include the date and time at which this color mark 60 was been displayed. Additional information can also be information about the nature of the show or the name of the show presently performed in the scene 2.

The operation of the interrupter 40 will now be described in more detail with reference to the method of FIG. 3.

Initially, during a first step 78, the display panels 46 are inserted in the scene 2.

Then, during a second step 80, a color mark 60 suitable for identifying the show performed in the scene 2 is obtained. This color mark 60 uniquely identifies this show from among the multitude of shows performed simultaneously in other scenes that are geographically separate from the scene 2 and where the identification method described here is also implemented.

Hereafter, it is considered that it is the color mark 60 that is obtained during the second step 80 to identify the soccer match played on the field 4.

To obtain the color mark 60, the first and second specific colors CS1, CS2 are first selected from among a set of possible colors that can be displayed by the display panels 46 and that are capable of being captured by the camera 12. This combination of colors is selected so as to allow the scene 2, and therefore the show running therein, to be identified by the tracer 44.

Preferably, it is the tracer 44 that automatically selects the first and second specific colors CS1, CS2 from among a set of colors that are available and that can be displayed by the display panels 46. In doing so, the tracer 44 also takes into account the specific colors already used to identify shows other than the one that is running in the scene 2. This can be achieved by taking into account the content of the database 52.

In some embodiments, the tracer 44 takes account of prohibited colors from a predetermined list of prohibited colors. The prohibited colors are colors that are inappropriate for distinguishing one scene 2 from another. For example, for the case in which several scenes are soccer fields, prohibited colors would include shades of green that match the colors of those fields.

For each available color, the tracer 44 has color coordinates Ri, Gi and Bi that code that color. Thus, during the second step 80, the tracer 44 selects the color coordinates R1, G1, B1 that code the first specific color CS1 and the color coordinates R2, G2, B2 that code the second specific color CS2.

During the second step 80, for each color coordinate Ri, Gi, Bi, the tracer 44 also automatically selects tolerance limits.

For example, for the color coordinate Ri, the tracer 44 selects an upper limit MhRi and a lower limit MbRi. The upper and lower limits MhRi, MbRi are chosen to cause each tolerance limit to be less than 10%, 5%, or 1% of the amplitude of the range of possible values for the value Ri. Preferably, each tolerance limit is also greater than 0.1% or 0.5% of the amplitude of the range of possible values for the value Ri.

In the embodiment described herein, the limits MhG1, MbG1 for the value G1 and the limits MhB1 and MbB1 for the value B1 are chosen in a manner identical to that which has been described for the limits MhRi and MbRi. For simplification, in this case, the limits MhR1, MhG1, MhB1, MbR1, MbG1 and MbB1 are all equal. The limits MhR2, MhG2, MhB2, MbR2, MbG2 and MbB2 for the values R2, G2 and B2, which code the second specific color CS2 are selected in the same way.

During a third step 82, the first and second specific colors CS1, CS2 selected during the second step 80 are recorded in the database 52 associated with an identifier of the scene 2. More specifically, the tracer 44 records, in the database 52, the values R1, G1, B1 and R2, G2, B2 as well as the tolerance limits selected during the second step 80 for each of these values.

Then, during a fourth step 84, while the match is running and during each active period, the tracer 44 commands the display panels 46 thereby causing each of them to simultaneously display the color mark 60 and to do so continuously over the whole duration of the active period. The duration of the active period is sufficiently long to make it very likely that at least one of the images filmed by the camera 12 will include the color mark 60. Embodiments include those in which the duration of the active period is greater than or equal to 0.03 seconds, 0.05 seconds, or 0.1 seconds.

The active period is sufficiently fleeting so that the display of the color mark 60 remains furtive, i.e. undetectable to the naked eye of a spectator. Embodiments thus include cases in which the duration of the active period is chosen to be less than 0.5 seconds and preferably less than 0.3 seconds or 0.2 seconds. In some embodiments, the duration of the active period is within ±15% of 0.1 seconds.

Inactive periods separate active periods from one another. During an inactive period, the display panels 46 do not display the color mark 60 or any other mark capable of allowing the scene 2 to be identified.

In this embodiment, during a fifth step 86, during each inactive period, the tracer 44 commands the display panels 46 to display information for the spectators. This information does not include a color mark 60. For example, the display panels 46 are used during inactive periods to display advertising. For this information to be visible and comprehensible by the spectators, the duration of the inactive period is relatively long. In some embodiments, the duration of the inactive period exceeds one second, twenty seconds, thirty seconds, or even one minute. In the embodiment described herein, the duration of the inactive period is chosen to be two seconds.

The tracer 44 continues to repeat the fourth and fifth steps 84, 86 over the match's entire duration.

In parallel, during a sixth step 90, the spectator's camera 12 films the match and distributes the video thus filmed via the video-sharing platform 14. Given that the display panels 46 are spread out all around the field 4, regardless of the spectator's position, it is almost inevitable that at least some if not numerous images of the video will include display panels 46.

In parallel with the fourth and fifth steps 84, 86 and with the sixth step 90, the tracer 44 executes a seventh step 100 that includes downloading, at predetermined intervals, images from the various videos available on the video-sharing platform 14. For example, for each video available, the tracer 44 downloads a sequence of the video. This sequence has a duration that is longer than the inactive period. As a result, it is almost certain that if one of the display panels 46 is found continuously in the optical axis of the camera 12, then the downloaded sequence will include at least one image in which the color mark 60 is apparent. This step provides a basis for quickly putting an end to the illegal distribution of the video of the match played on the field 4, Then, during an eighth step 102, the tracer 44 inspects each image of each downloaded sequence to determined whether the color mark 60 is present in that image.

For example, for this purpose, the eighth step 102 includes a first operation 104 during which the tracer 44 maintains a pixel count Np that represents the number of pixels in the image that have a color that matches the first specific color CS1. To do so, the tracer 44 compares each triplet (Rp, Gp, Bp) that codes the pixel's color with the ranges [R1−MbR1; R1+MhR1], [G1−MbG1; G1+MhG1] and [B1−MbB1; B1+MhB1] respectively. If each of the color coordinate Rp, Gp, Bp is located within the intended range, then the tracer 44 increments the pixel count Np by one. Otherwise, the tracer 44 leaves the pixel count Np alone.

Then, once it has run through all the pixels of the downloaded image, during a second operation 106 of the eighth step 102, the tracer 44 compares the pixel count Np with a predetermined first threshold S1. In some embodiments, the tracer 44 does so by comparing the ratio 100(Np/PT) with the first threshold S1, where PT is the total number of pixels in the downloaded image. Embodiments include those in which the threshold S1 is greater than or equal to 0.5%, those in which it is greater than or equal to 1%, and those in which it is greater than or equal to 5%.

If the ratio 100(Np/PT) is less than the first threshold S1, then the tracer 44 indicates that the first specific color CS1 has not been found in the downloaded image. In that case, the method goes straight back to the first operation 104 to process the next image in the downloaded sequence.

Otherwise, i.e. if the ratio 100(Np/PT) exceeds the first threshold S1, the tracer 44 executes a third operation 110 in which it indicates that the first specific color CS1 has been found in the downloaded image. In that case, first through third operations 104-110 are repeated but for the second specific color CS2. In the case of the second specific color CS2, the tracer 44 replaces the first threshold S1 with a predetermined second threshold S2 that is greater than or equal to 0.5% or 1% or 5%. The second threshold S2 is not necessarily equal to the first threshold S1.

At the end of the eighth step 102, if the two specific colors CS1 and CS2 have been found in the downloaded image, the tracer 44 executes a ninth step 112 in which it identifies that the filmed scene is the scene 2. To do so, the tracer 44 searches the database 52 for the identifier associated with the first and second specific colors CS1 and CS2. If the scene 2 is identified, during ninth step 112, the tracer 44 also reads and extracts additional information coded in the barcode of the color mark 60. This extracted additional information is then used and/or stored by the tracer 44 for later automatic processing.

During a tenth step 114, as soon as the show has been identified, the tracer 44 immediately transmits to the video-sharing platform 14 a command to interrupt the distribution of this video.

During an eleventh step 116, in response to having received the interruption command, the video-sharing platform 14 immediately suspends the distribution of this video. For example, the video-sharing platform 14 stops and prevents any streaming broadcast of this video to terminals such as the terminals 20.

If the set of images of the video sequence has been processed as described previously, the tracer 44 downloads a new video sequence from the video-sharing platform 14 and processes it as described above.

Many other embodiments are possible.

For example, the features to identify the video and to prevent its distribution by the video-sharing platform 14 have been described here for the particular case in which they are both implemented within the same tracer 44.

In some embodiments, only the features for identifying the video are implemented in the tracer 44 and the features to prevent the distribution of a video identified by the tracer 44 are then implemented in another device that is separate from the tracer 44 but connected to it, for example, via a wide-area network 18.

In other embodiments, the stands 6 do not surround the field 4. In yet other embodiments, the scene 2 does not include stands 6.

The show identifier 42 for identifying the scene 2 can be used for purposes other than those involving preventing the distribution of an identified video.

In some embodiments, the show identifier 42 is incorporated into a system that automatically associates with the video additional information on the show identified in this video. In some embodiments, the additional information is information on the geographic placing of the show, its history, or any other information specific to this show. When the show identifier 42 is used for purposes other than to interrupt the distribution of a video from the video-sharing platform 14, it is not necessarily connected to such a platform and can download the video from any source.

Other embodiments of the portable device 13 are possible. For example, in some embodiments, the portable device 13 may be a portable computer equipped with a web cam.

Likewise, other embodiments of the video-sharing platform 14 are possible. For example, in some embodiments, the video-sharing platform 14 is the platform used under the commercial name LIVESTREAM™ or USTREAM™ or SNAPCHAT™.

The display panels 46 can be of different forms. For example, in a particular embodiment, the display panel 46 is in the form of a vertical column which displays the specific color or the juxtaposition of specific colors over its entire horizontal periphery. Thus, this display panel 46 exhibits a horizontal opening angle of 360°. In another embodiment, the display panel 46 is that used to display the scores or a giant screen. The display panel 46 can also include a controllable winder suitable for winding up and, alternately, unwinding a poster in order to make this poster visible and, alternately, to mask it. In that case, a poster containing the color mark 60 is installed in this display panel 46 beforehand.

The identification device can be simplified. For example, it can include only one display panel 46.

Many other embodiments are possible for the color mark 60. For example, the color mark 60 can be replaced by a juxtaposition, not of simply two colors but, on the other hand, of three or four or at least five specific colors. For the case in which the color mark 60 includes several specific colors, it is possible to compare the sum of the pixel counts Np counted for each of these specific colors with a single threshold and to indicate that the color mark 60 is found in the image if this sum exceeds this threshold.

When the color mark 60 includes several specific colors, it is also possible to indicate that the color mark 60 is found in the downloaded image as soon as the pixel count Np counted for only one of these specific colors exceeds the predetermined threshold associated with this specific color.

In a simplified embodiment, only one specific color is used to identify the show and not a juxtaposition of specific colors.

For the case in which only one specific color CS1 is used to identify the scene 2, the tracer 44 can even so be programmed to display a barcode using at least two colors CS2 and CS3. Each of the values coding these colors CS2 and CS3 is then chosen to be within the ranges [R1−MbR1; R1+MhR1], [G1−MbG1; G1+MhG1] and [B1−MbB1; B1+MhB1]. However, the colors CS2 and CS3 are slightly different from one another, thereby enabling a barcode to be produced while using only colors that correspond to one and the same specific color CS1. Thus, due to tolerance limits, to identify the show, these two colors CS2 and CS3 are processed as one and the same specific color CS1. On the other hand, during operation 112, an additional item of information coded by the use of these colors CS2 and CS3 can still be read in the downloaded image.

In other embodiments, the tolerance limits on each specific color are not used and can be omitted.

In another embodiment, the color mark 60 takes the form of a barcode, not a one-dimensional one as described with reference to FIG. 2, but a two-dimensional one. In that case, the color mark 60 takes the form of a QR code.

In a simplified embodiment, the color mark 60 does not code any additional information. In that case, the color mark 60 does not need to take the form of a barcode. For example, the color mark 60 can take the form of a checkerboard, the boxes of which are, alternately, of a first and a second specific color. When the color mark 60 does not form a barcode, the operation to read such a barcode is omitted.

The color mark 60 has been described for the particular case in which the coding of the colors is RGB coding. However other color coding schemes are possible. For example, the following coding schemes can be used in place of RGB coding: RGBA (Red Green Blue Alpha) coding, Y'CbCr coding, HSB (Hue Saturation Brightness) coding, and HSL (Hue Saturation Lightness) coding.

A show can be performed over a group of several scenes geographically at a distance from one another, and for which it is desired to be able to prevent the distribution of all videos filmed in any one of these scenes. In this case, the same color mark 60 is used on each of these scenes. To prevent the distribution of a video of this show, it is not necessary to identify precisely the scene 2 from among the group of scenes of this group where this video has been filmed. In that case, the color mark 60 does not identify a specific scene 2 but only the show. Thus, in this embodiment, the show identifier and the scene identifier are not interchangeable. By way of illustration, such a show can be the Olympic Games which take place in a multitude of stadiums, and therefore in a multitude of different scenes.

During each active period, the displayed color mark 60 is not necessarily the same as the color mark 60 displayed during a previous active period. In some embodiments, different marks are displayed one after the other in a predetermined order. In that case, the database 52 associates with each of these different marks the same show identifier. In other practices, before each active period, the color mark 60 that is to be displayed is drawn randomly from a predetermined list containing several different marks capable of being displayed to identify the same show. The various marks displayed in the same scene 2 are hence distinguished, for example, visually from one another by their form or by their color.

Likewise, the place where the color mark 60 is displayed can also be modified from one active period to the next. For example, it is possible to first display the color mark 60 once to the right of the screen 48 and then once to the left of this screen 48. It is also possible to display alternately on a first display device then, during the next active period, on a second display device located at a different place in the scene 2.

The displaying of the color mark 60 can be triggered automatically or manually. In some practices, an operator triggers display of the color mark 60 by manually pressing a button. Conversely, as described previously, the triggering of the active period can be an automatic event triggered periodically. In another embodiment, the duration of inactive periods is drawn randomly. This results in aperiodic display of the color mark 60.

In another embodiment, the implementation of the identification method is not made furtive. For example, in this case, the active period is longer than one second, ten seconds, or one minute. In another embodiment, inactive periods are omitted and only one active period is used. This single active period hence lasts as long as the identification method is implemented.

During inactive periods, the displaying of information by the display panels 46 can be omitted. For example, during inactive periods, the display panels 46 are off.

The second step 80 and the third step 82 can be carried out differently. For example, it is also possible to prefill the database 52 with a large number of pre-recorded distinct marks and to then assign one of these marks to the scene 2. To that end, the identifier of the scene 2 is associated with this color mark 60 in the database 52.

In another embodiment, the second step 80 includes the obtaining of an image of the captured scene 2, for example, before the show is performed therein. Next, this image is analyzed to identify the colors present in this image. Then, during the second step 80, the tracer 44 automatically selects, as a specific color, one or more colors that are not present in the analyzed image or that represent less than 1% or 0.5% of the pixels of the analyzed image.

The process of searching for a color mark 60 can be carried out in a way that differs from counting only pixels whose color matches the specific color or colors. One alternative practice includes constructing a histogram of the colors of the downloaded image by counting the pixels of each color. This histogram indicates, for each color of the image, the number of pixels having that color. Having constructed such a histogram, it becomes possible to then compare the height of the bar corresponding to the specific color sought with the predetermined threshold. If the bar is higher than the predetermined threshold, the tracer 44 indicates that the specific color has been found in the image. Otherwise, the tracer 44 indicates that this specific color has not been found in this image.

During the fourth step 84, it is also possible to cause the color mark 60 to be displayed on only a limited number of display panels 46 that are present in the scene 2.

In another embodiment, the predetermined threshold is an absolute number of pixels rather than a percentage. In that case, the predetermined threshold is greater than or equal to one pixel and, preferably, greater than five or ten pixels and, advantageously, greater than 10,000, 20,000, 80,000, 160,000, 800,000 or 2,400,000 pixels. During the third operation 110, it is therefore the pixel count Np that is directly compared with this predetermined threshold.

The searching can also include a prior operation for identifying those areas of the image that would be capable of containing the specific colors sought followed by searching for the specific color only within those selected areas. For example, if the display panel 46 were rectangular, the tracer 44 would select, in the downloaded image, only those areas that comprise a quadrilateral.

The invention claimed is:

1. A method comprising identifying a show in a video that has been filmed by a spectator's camera, wherein said method comprises executing a first step, a second step, a third step, and a fourth step, wherein said first step comprises selecting a color set, wherein said color set comprises at least one specific color to identify said show, wherein said second step comprises recording, in a database, a show identifier of said show associated with values that code said color set, wherein said third step comprises raising a likelihood that said camera will capture said displayed color set, wherein raising said likelihood that said camera will capture said displayed color set comprises, before said show is filmed by said camera, and following, insertion into a scene in which said show is to be performed, of a display-panel set that comprises at least one controllable display panel that is suitable for displaying said color set, causing said display-panel set to display said color set without considering scene lighting, wherein said fourth step comprises, once said camera has begun filming a video of said scene, causing a tracer to download at least one image of said video, causing said tracer to search within said image for said color set associated by said database with said show identifier, and causing said tracer to respond to finding said color set by identifying said filmed show with the aid of said show identifier, and wherein said tracer comprises an electronic device for tracing said show.

2. The method of claim 1, wherein causing said tracer to search within said image for said color set comprises, for each specific color associated, by said database, with said identifier, counting the number of pixels of said downloaded image for which said color matches said specific color, thereby obtaining a pixel count, comparing said pixel count with a predetermined threshold, and indicating that said specific color has been found in said downloaded image only if said pixel count exceeds said predetermined threshold.

3. The method of claim 2, further comprising incrementing said pixel count for a particular pixel only if a color of said particular pixel is within a range of values that surrounds a value that is coded for one of said specific colors, wherein said range extends from a lower tolerance to an upper tolerance, wherein said lower and upper tolerances are each greater than 0.1% of an amplitude of a range of possible values for said value that codes said one of said specific colors.

4. The method of claim 1, wherein, said first step comprises selecting several specific colors to identify said show, wherein said third step comprises displaying said specific colors juxtaposed with one another so as to form a barcode in which additional information is encoded, said method further comprising, only if said scene is identified in said downloaded image, causing said tracing device to read said bar code and to extract additional information from said bar code, wherein said bar code is a one-dimensional bar code.

5. The method of claim 1, wherein, said first step comprises selecting several specific colors are selected to identify said show, wherein said third step comprises displaying said specific colors juxtaposed with one another so as to form a barcode in which additional information is encoded, said method further comprising, only if said scene is identified in said downloaded image, causing said tracing device to read said bar code and to extract additional information from said bar code, wherein said bar code is a two-dimensional bar code.

6. The method of claim 1, wherein causing said display-panel set to display said color set comprises causing said display to occur only during successive active periods and, between successive active periods, suppressing display of said color set by said display-panel set, thereby causing active periods to be separated from each other by inactive periods.

7. The method of claim 6, further comprising selecting said inactive periods to last for at least one second.

8. The method of claim 6, further comprising choosing a duration of each active period to be between 0.05 seconds and 0.5 seconds.

9. The method of claim 6, further comprising, during said inactive periods causing said display-panel set to display information to spectators, wherein said information is information from which identification of said show is not possible.

10. The method of claim 1, further comprising automatically interrupting distribution of a video that can be downloaded from a video-sharing platform, wherein said method comprises, after having caused said tracer to respond to finding said color set by identifying said filmed show, detecting said show in said video, and, in response, automatically transmitting, to said video-sharing platform, an instruction to interrupt distribution of said video, wherein, in response to said instruction, said video-sharing platform prevents downloading of said video.

11. An apparatus for tracing a show in a video filmed by a spectator's camera, said apparatus comprising a microprocessor and a memory, wherein said memory includes a database, wherein said database comprises identifiers of shows, wherein each identifier is associated with values that code a color set selected to identify said show, wherein said color set comprises one or more specific colors, wherein said microprocessor is programmed to download at least one image of said video, to search, in said downloaded image, for said color set and, if said color set is found in said downloaded image, to identify said show with the aid of said show identifier associated by said database with said color set.

12. The method of claim 1, further comprising causing pixels of said controllable display panel comprises pixels to display colors.

13. The method of claim 12, further comprising providing, to an electronic control unit, a color mark to display and causing said electronic control unit to display said received mark on said controllable display panel.

14. The method of claim 1, wherein the display-panel set comprises plural display panels.

15. The method of claim 1, wherein the display-panel set comprises display panels that are arranged all the way around said scene.

16. A manufacture comprising a tangible and non-transitory information-recording medium having, encoded thereon, instructions that cause a data-processing system to identify a show in a video that has been filmed by a spectator's camera, wherein said method comprises executing a first step, a second step, a third step, and a fourth step, wherein said first step comprises selecting a color set that comprises at least one specific color to identify said show, said at least one specific color having been selected from a set of possible colors, wherein said second step comprises recording, in a database, a show identifier of said show associated with values that code said color set, wherein said third step comprises raising a likelihood that said camera will capture said displayed color set, wherein raising said likelihood that said camera will capture said displayed color set comprises, before said show is filmed by said camera and after a display-panel set that comprises at least one controllable display panel that is suitable for displaying said color set has been inserted into a scene in which said show is to be performed, causing said display-panel set to display said color set without considering scene lighting, wherein said fourth step comprises, once said camera has begun filming a video of said scene, causing a tracer to download at least one image of said video, causing said tracer to search within said image for said color set associated by said database with said show identifier, and causing said tracer to respond to finding said color set by identifying said filmed show with the aid of said show identifier.

* * * * *